United States Patent [19]

Kim et al.

[11] Patent Number: 5,974,046
[45] Date of Patent: Oct. 26, 1999

[54] MAINTENANCE METHOD FOR SUBSCRIBER LINES OF BROADBAND NETWORK TERMINATION APPARATUS IN AN ASYNCHRONOUS TRANSFER MODE PERMANENT VIRTUAL CONNECTION SWITCHING SYSTEM

[75] Inventors: Gwan-Joong Kim; Young-Sun Kim, both of Daejeon, Rep. of Korea

[73] Assignee: Electronics and Telecommunications Research Institute, Daejeon, Rep. of Korea

[21] Appl. No.: 08/857,352

[22] Filed: May 16, 1997

[51] Int. Cl.[6] .............................. H04L 12/28; H04J 1/16
[52] U.S. Cl. ........................................... 370/395; 370/242
[58] Field of Search ................................... 370/242, 247, 370/392, 395, 397, 409, 410, 465

[56] References Cited

U.S. PATENT DOCUMENTS

| | | |
|---|---|---|
| 5,060,226 | 10/1991 | Gewin et al. . |
| 5,408,469 | 4/1995 | Opher et al. ............................ 370/399 |
| 5,777,986 | 7/1998 | Grossman ............................... 370/409 |
| 5,805,593 | 9/1998 | Busche .................................... 370/406 |

OTHER PUBLICATIONS

ATM Networks, Concepts, Protocols, Applications, Second Edition, Rainer–Handel, Manfred N. Huber–Stefan Schroder; pp. 129–132.
International Telecommunication Union, ITU–T 1.610 (Nov. 1995), Telecommunication Standardization Sector of ITU, Integrted Services Digital Network (ISDN), Maintenance Principles, B–ISDN Operation and M aintenance Principles and Functions, pp. 1–46.
IEEE Communications Magazine, May 1993, Microcell Technology, Managing ATM–based Broadband Networks by Stphen C. Farkouh, pp. 82–86.
IEEE Communications Magazine, Dec. 1996, Operations Standards for Global ATM Networks: Network Element View, by Jon Anderson and Patrice Lamy, Lucent Technologies, Inc. and Laurent Hue and Luc Le Beller, France Telecom/CNET, pp. 72–84.
The ATM Forum Technical Committee, M4 Interface Requirements and Logical MIB: ATM Network Element View, 96–100R1 (af–nm–0020.001) Draft, Working baseline version, Dec. 1996, pp. ii–4.

*Primary Examiner*—Huy D. Vu
*Assistant Examiner*—Chiho Andrew Lee
*Attorney, Agent, or Firm*—Cohen, Pontani, Lieberman & Pavane

[57] ABSTRACT

A maintenance method for a subscriber line of a B-NT in an ATM PVC switching system which is capable of more expanding a maintenance range of an OAM cell loopback function disclosed in the article 2. The method includes the steps of a first step in which a loopback OAM cell is transmitted to a B-NT when the ATM PVC switching system receives a request of a state information of subscriber links of a B-NT from an operator, or a loopback operation timer becomes time-out, a second step in which the B-NT, which receives a loopback OAM cell from the ATM PVC switching system, carries the statement information of subscriber lines of B-NT apparatus on a loopback OAM cell and then transmits the information to the ATM PVC switching system, and a third step in which the ATM PVC switching system, which receives a loopback OAM cell from the B-NT apparatus, stores a state information of subscriber lines into a state management table, reports a state information of subscriber lines to the system operator.

2 Claims, 8 Drawing Sheets

FIG. 8

MAINTENANCE METHOD FOR SUBSCRIBER LINES OF BROADBAND NETWORK TERMINATION APPARATUS IN AN ASYNCHRONOUS TRANSFER MODE PERMANENT VIRTUAL CONNECTION SWITCHING SYSTEM

BACKGROUND OF THE INVENTION

1. Field of the Invention

The present invention relates to a maintenance method for subscriber lines of a broadband network termination (hereinafter celled a B-NT) apparatus in an asynchronous transfer mode permanent virtual connection (hereinafter called an ATM PVC) switching System, and in particular, to an improved fault management method for subscriber lines of a B-NT in an ATM PVC switching system which is designed to perform a switching function with respect to a virtual path (VP).

2. Description of the Conventional Art

Generally, an ATM PVC switching system which performs a switching function with respect to the virtual path unit and does not provide a signaling capability is disposed in an initial B-ISDN public network. The B-NT apparatus of a subscriber network of B-ISDN includes an apparatus for only performing a virtual channel (VC) switching function without concurrently performing a VP/VC switching function. The subscriber line is not directly connected to an ATM switching system and is mainly connected to the B-ISDN public network through the B-NT apparatus.

Since the B-ISDN is capable of providing various high speed and broadband services compared to a conventional public switched telephone network (PSTN), a public switched data network (PSDN), and an integrated service digital network (ISDN), it is very important to continuously provide with a high quality service to subscribers.

There are known conventional maintenance methods for subscriber lines of the B-NT in the ATM PVC switching system.

[Prior art 1]

U.S. Pat. No. 5,060,226, "Telecommunications Network Test System", Oct. 22, 1991, U.S.

[Article 1]

Rainer Handel, Manfred N. Huber, Stefan Schroder, "ATM Network: Concepts, Protocols, Applications", Addison-Wesley, 1994, pp. 129–133.

[Article 2]

ITU-T Rec. I.610, "B-ISDN Operation and Maintenance Principles and Functions", Geneva, Switzerland, 1994.

[Article 3]

Syephen C. Farkouh, "Managing ATM-based Broadband Networks", IEEE Comm. Magazine, May 1993.

[Article 4]

Jon Anderson, Laurent Hue, Lue Le Beller, "Operations Standards for Global ATM Network; Network Element view", IEEE Comm. Magazine, December 1996.

[Article 5]

ATM Forum Technical Committee Network Management Working Group, "M4 Interface Requirements and Logical Element View", December 1996.

A. A subscriber line test of a digital communication network.

According to the prior art 1, the subscriber line test of the digital network is performed by using a loopback method in the telecommunication line test system. In the master test unit, a test data is generated, and the generated test data is carried on a loopback message and then is transmitted to a remote unit. In the loopback mode, all the test data echoed back to master unit is compared and analyzed for errors using established B.E.R.T (Bit Error Rate Test) techniques. However, the prior art 1 is directed to a subscriber line test method which may be adapted to a digital communication network such as an ISDN. However, the prior art 1 can not be adapted to a subscriber line maintenance method with respect to the B-ISDN.

B. An operation, administration and maintenance (OAM) mechanism for the B-ISDN.

The ATM PVC switching system is capable of performing an OAM function of an ATM layer as far as the B-NT which is an end point of an F4 flow in the OAM flow based on an ITU-T I.610 of the articles 1 and 2. Therefore, on the assumption that the B-NT which performs the VC switching function is connected to the ATM PVC switching system, and a subscriber is connected to this B-NT, the ATM PVC switching system can not directly perform the OAM function with respect to a subscriber line (Sb interface) of the B-NT.

C. A method for using a loopback OAM cell

According to an ITU-T I.610 recommendation in the article 2, there are described the OAM principles and functions of the B-ISDN network. According to the ITU-T I.160, OAM loopback cells are used to verify part of or the complete end-to-end connection. This cell includes instructions as to where it should be looped, and does not effect user data. Cells may be looped within a local ATM network, across an intermediate network, or at a distant location. Therefore, this loopbacks simply allows the administrator to verify connectivity, localize faults.

D. A method for using a VC_AIS message

In the articles 3 and 4, the B-NT which performs a VC switching function transmits a virtual channel—alarm indication signal (hereinafter called VC-AIS) to a downstream point of the virtual channel connection (VCC) when a fault is detected in a subscriber line. Namely, in all the apparatuses disposed in a downstream of a VC connection point, the VC-AIS is received, whereby it is possible to recognize that a fault is occurred in the Sb interface. However, since the ATM VP switching system performs only a VP switching function, it is impossible to recognize a VC_AIS message. Therefore, in the ATM VP switching system, it is impossible to recognize the fault generated in subscriber lines of the B-NT.

E. A method for using an integrated network management system.

According to the network management system for a B-ISDN recommended in an ATM Forum Network Management WG (Working Group) disclosed in the article 5, the network management of a private network is managed by a private network management system, and the network management for a public network is managed by a public network management system. The management information exchange between the private network management system and the public network management system is performed by an M3 interface. Namely, The management information exchange between the ATM PVC switching system disposed in the public network of the B-ISDN and the B-NT apparatus disposed in the private network is performed by only the M3 interface. However, it may take long time for building the network management systems of the public network and private network of the B-ISDN and exchanging the management information therebetween. In addition, the above-described method is expensive compared to the method of directly maintaining the subscriber line of the B-NT apparatus in the ATM switching system.

According to the articles 1, 2, 3 and 4, it is impossible for the ATM PVC switching system to directly perform the OAM function with respect to a subscriber of the B-NT which performs the VC switching function.

In addition, according to the article 5, it may take long time for building the network management systems of the public network and the private network of the B-ISDN and exchanging the management information therebetween. In addition, the above-described method is expensive compared to the method of directly maintaining the subscriber line of the B-NT apparatus in the ATM switching system.

SUMMARY OF THE INVENTION

Accordingly, it is an object of the present invention to provide a maintenance method for subscriber lines of a B-NT in an ATM PVC switching system which overcomes the aforementioned problems encountered in the conventional art.

It is another object of the present invention to provide an improved maintenance method for subscriber lines of a B-NT in an ATM PVC switching system which is designed to perform a switching function with respect to a virtual path.

It is another object of the present invention to provide an improved maintenance method for subscriber lines of a B-NT in an ATM PVC switching system which is capable of directly performing a maintenance function of subscriber lines of a B-NT which performs a VC switching function because in the conventional ATM PVC switching system, it is impossible to gather in real time a related fault and performance information with respect to subscriber lines of a B-NT directly.

It is another object of the present invention to provide an improved maintenance method for subscriber lines of a B-NT in an ATM PVC switching system which is capable of more expanding an operation range of an OAM cell loopback function disclosed in the article 2.

It is another object of the present invention to provide an improved maintenance method for subscriber lines of a B-NT in an ATM PVC switching system which is directed to a method in which a loopback OAM cell is transmitted from an ATM PVC switching system to a loopback OAM cell, and a fault information generated in the Sb interface is carried on a source ID field of a loopback response message and then is transmitted to an ATM PVC switching system whereby it is possible to recognize a fault state of subscriber lines of a BENT in an ATM switching system.

To achieve the above objects, there is provided a maintenance method for subscriber lines of a BENT in an ATM PVC switching system which includes the steps of a first step in which a loopback OAM cell is transmitted to a B-NT when the ATM PVC switching system receives a request of a state information of subscriber links of a B-NT from an operator, or a loopback operation timer becomes time-out, a second step in which the B-NT, which receives a loopback OAM cell from the ATM PVC switching system, carries a related fault and performance information of subscriber lines currently gathered from a state management table on a loopback OAM cell and then transmits the information to the ATM PVC switching system, and a third step in which the ATM PVC switching system, which receives a loopback response message from the B-NT apparatus, stores a state information of subscriber lines into a state management table, reports a state information of subscriber lines to the system operator, and repairs the corresponding lines, wherein the maintenance method for subscriber lines of a B-NT in an ATM PVC switching system has the ATM PVC switching system disposed in a delivery network of a B-ISDN network for performing a VP switching function and an OAM function, and a B-NT apparatus disposed in a customer premises network and connected to the ATM PVC switching system for performing a network termination function, multiplexing/concentrating/switching functions, and fault management and performance management functions.

To achieve the above objects, there is provided a maintenance method for subscriber lines of a B-NT in an ATM PVC switching system which further includes a fourth step in which the B-NT apparatus performs a related fault and performance management function with respect to subscriber lines and stores a result of maintenance into a state management table, and a fifth step for localizing the fault line and informing a result of maintenance to a administrator.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
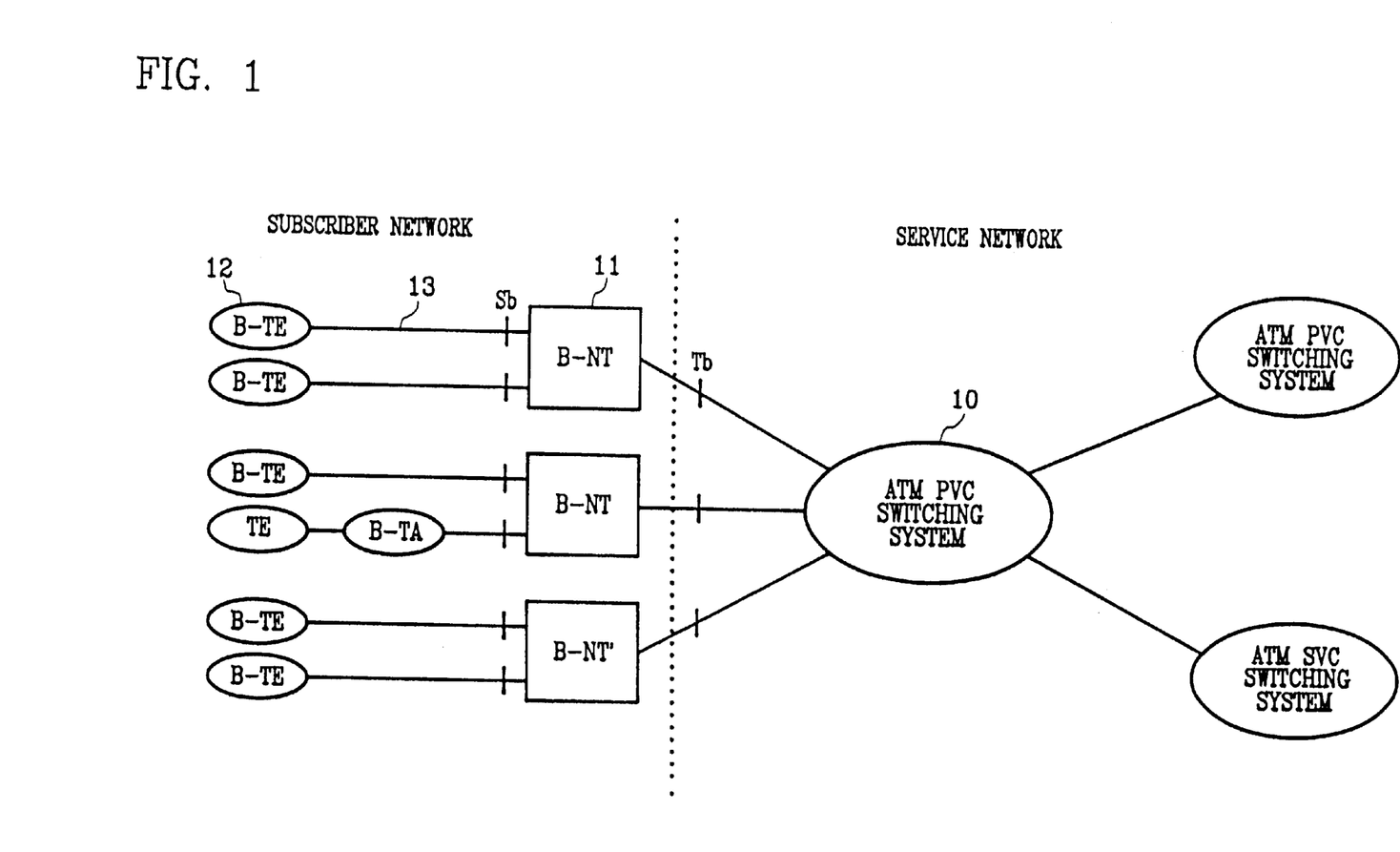
FIG. 1 is a diagram illustrating a broadband integrated services digital network (hereinafter called a B-ISDN) adapted in a maintenance method for subscriber lines of a B-NT in an ATM PVC switching system according to the present invention.

FIG. 1 illustrates a B-ISDN adapted in a maintenance method for subscriber lines of a B-NT in an ATM PVC switching system according to the present invention.

As shown therein, the B-ISDN consist of a customer premises network (CPN) and a delivery network.

The maintenance method for subscriber lines of a B-NT in an ATM PVC switching system is adapted to an ATM PVC switching system 10 and a B-NT apparatus 11. The ATM PVC switching system is disposed in an access network or a core network of B-ISDN, and the B-NT apparatus 11 is disposed in a subscriber network of B-ISDN. The subscriber line 12 of the B-ISDN is connected to a B-NT apparatus 11 through the Sb interface 13. The ATM PVC switching system 10 performs a switching function, a fault management, and a performance management function by the VP unit, and the B-NT apparatus 11 performs a VC switching function and a fault management function, a performance management function, etc.

Figure 2:
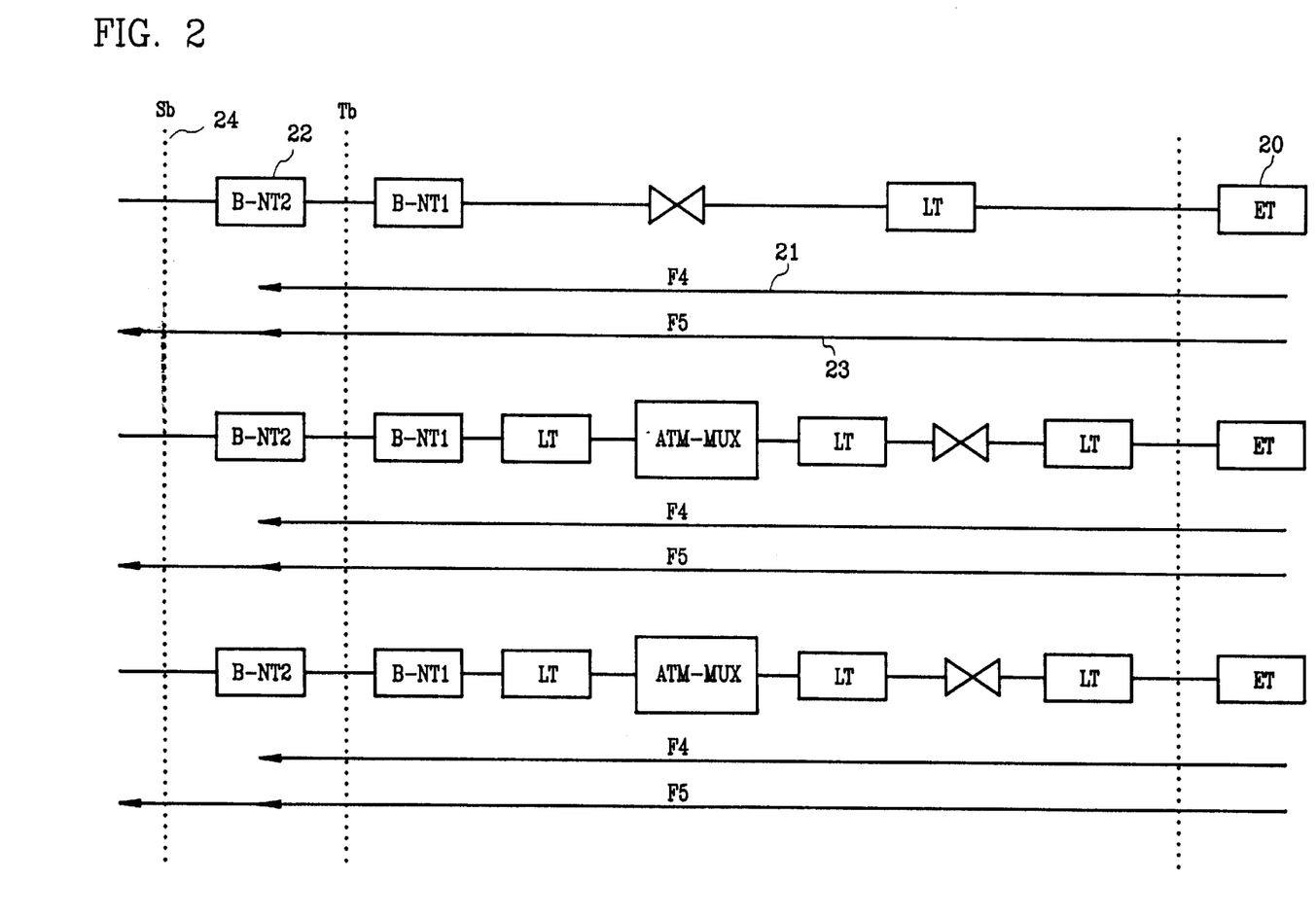
FIG. 2 is a diagram illustrating an operation, administration and maintenance (hereinafter called an OAM) for an ATM layer of a B-ISDN.

FIG. 2 illustrates an operation, administration and maintenance (hereinafter called an OAM) for an ATM layer of a B-ISDN.

AS shown therein, the ATM PVC switching system 20 performs an OAM function up to a B-NT2 which is an end point of the F4 flow 21. In addition, the ATM switched virtual connection switching system is capable of expanding the OAM function up to a B-TE (Broadband Terminal Equipment) and a B-TA (Broadband Terminal Adapter) which is an end point of the F5 flow 23. Namely, the ATM PVC switching system is performed the OAM function up to the B-NT apparatus which is an end point of the F4 flow, it is impossible to directly perform the maintenance function with respect to the Sb interface 24.

Figure 3:
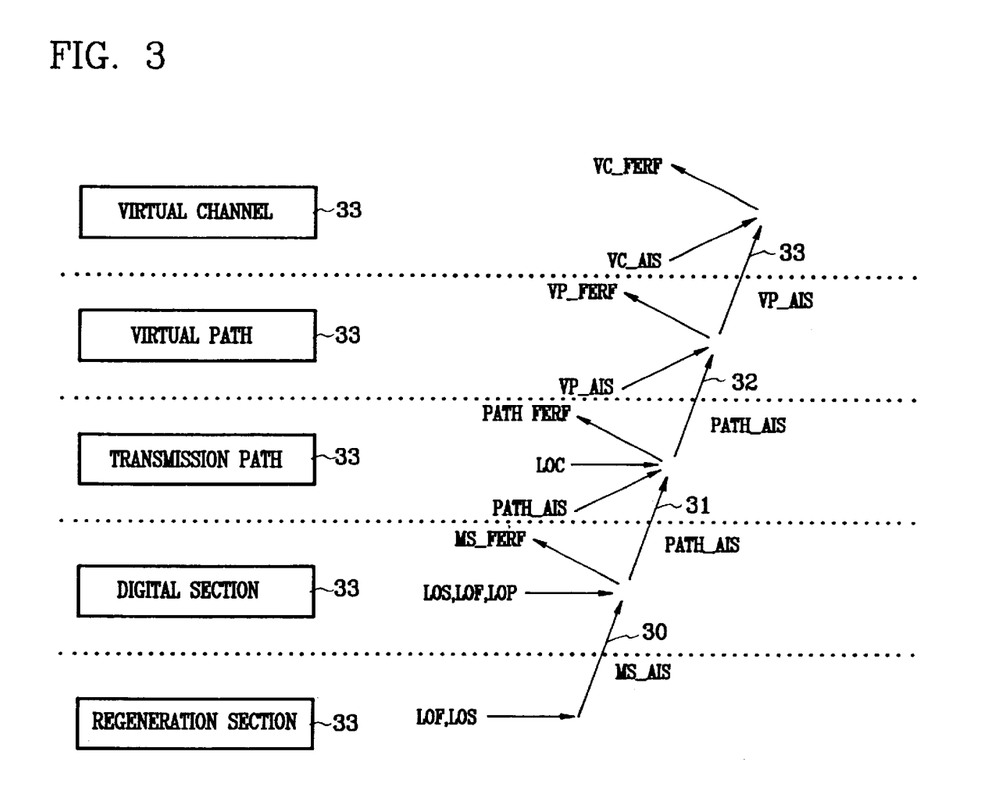
FIG. 3 is a diagram illustrating a fault processing method for a B-ISDN.

FIG. 3 illustrates a fault processing method for a B-ISDN according to the present invention.

As shown therein, when a loss of a frame (LOF), and a loss of a cell delineation (LOC) are detected from a regeneration section layer 34, a MS__AIS 30 is transmitted to a upper layer. In addition, when a lose of a signal (LOS), the LOF, a loss of an AU pointer (LOP) is generated or the MS__AIS is received from a lower layer, a path__AIS 31 is transmitted to the upper layer. Also, when the LOC is generated from a transmission path layer 36, and the path__AIS 31 is received from the lower layer, a path__AIS 32 is transmitted to the upper layer. When a VP__AIS is generated from the virtual path layer, a VP__AIS 33 is transmitted to the upper layer. In addition, in a virtual channel layer 38, when a VC__AIS is generated, or the VP__AIS is received from the lower layer, a VC__FERF 38 is transmitted to the upper layer.

Figure 4:
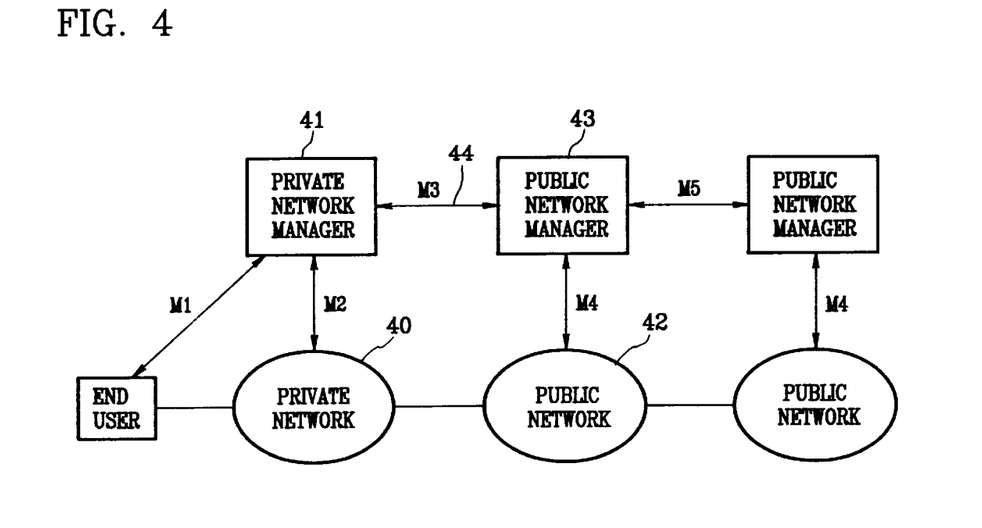
FIG. 4 is a diagram illustrating an integrated network management process for a B-ISDN according to the present invention.

FIG. 4 illustrates an integrated network management System for a B-ISDN network according to the present invention.

As shown therein, the network management with respect to the private network 40 is performed by the private network management system 41. The network management of the public network 42 is performed by the public network management system 43. The exchange of the management information between the private network management system and the public network management system is performed by the M3 interface 44. Namely, in the B-ISDN, the maintenance of the public network element is performed through an maintenance information exchange between the network management systems.

Figure 5:
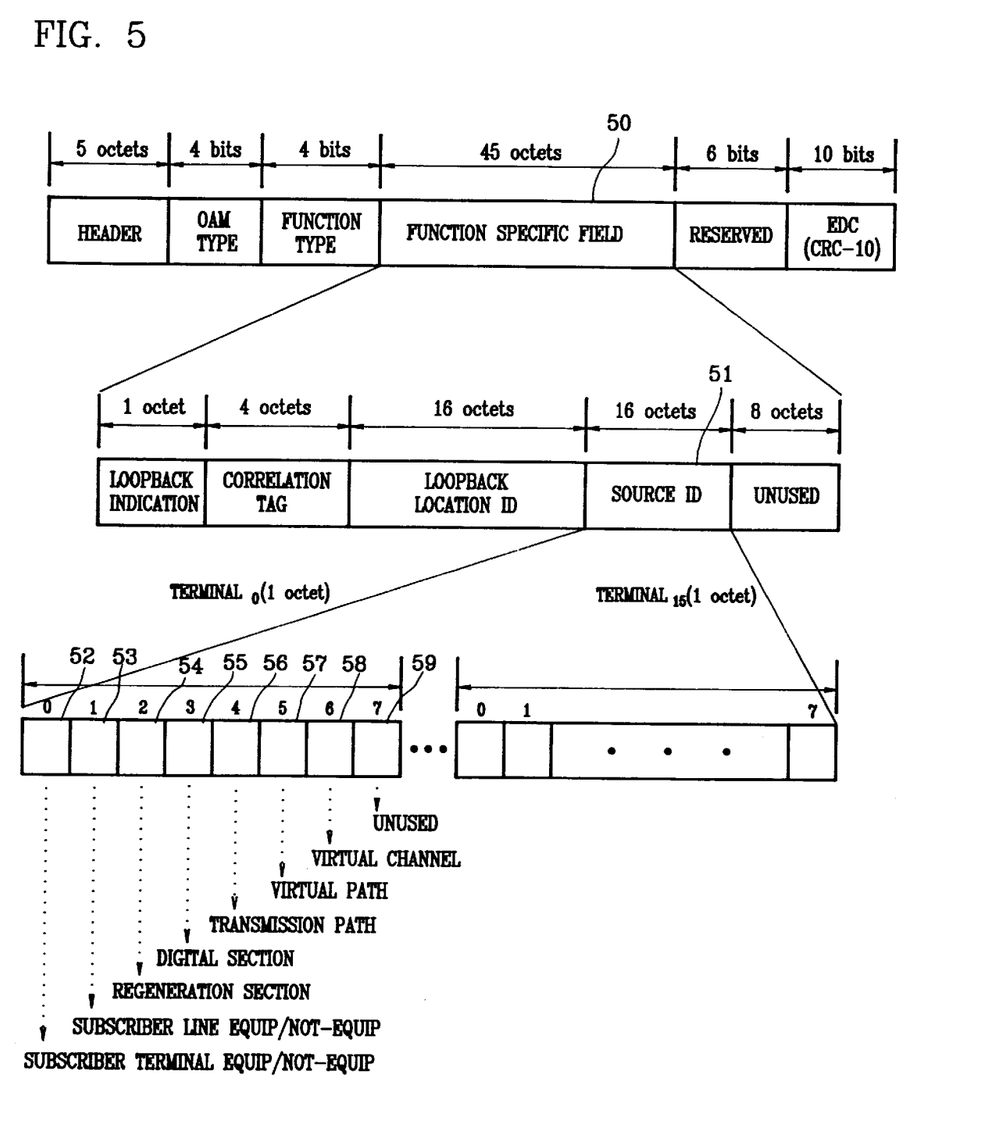
FIG. 5 is a diagram illustrating a method for indicating a fault information of subscriber lines on an OAM cell according to the present invention.

FIG. 5 illustrates a method for indicating the fault information of subscriber lines on an OAM cell according to the present invention.

As shown therein, when the B-NT receives a loopback OAM cell from the ATM switching system, the B-NT carries a state information of subscriber lines on a source ID 51 of the function specific field 50 of the loopback response OAM cell. The source ID has a length of 16 Octet, and the fault information with respect to one link of the Sb interface is indicated as 1 Octet. In each octet, the equipment state of a subscriber line from the least significant bit (LSB) 52 by one bit (equipped: 1, non-equipped: 0), the equipment state of the subscriber link 53 (equipped: 1, non-equipped: 0), the state of the regeneration section 54 (abnormal: 1, normal: 0), the state of the digital section 55 (abnormal: 1, normal: 0), the state of the transmission path 56 (abnormal: 1, normal: 0), the state of the virtual path 57 (abnormal: 1, normal: 0), and the state of the virtual channel 58 (abnormal: 1, normal: 0) are sequentially indicated.

Figure 6:
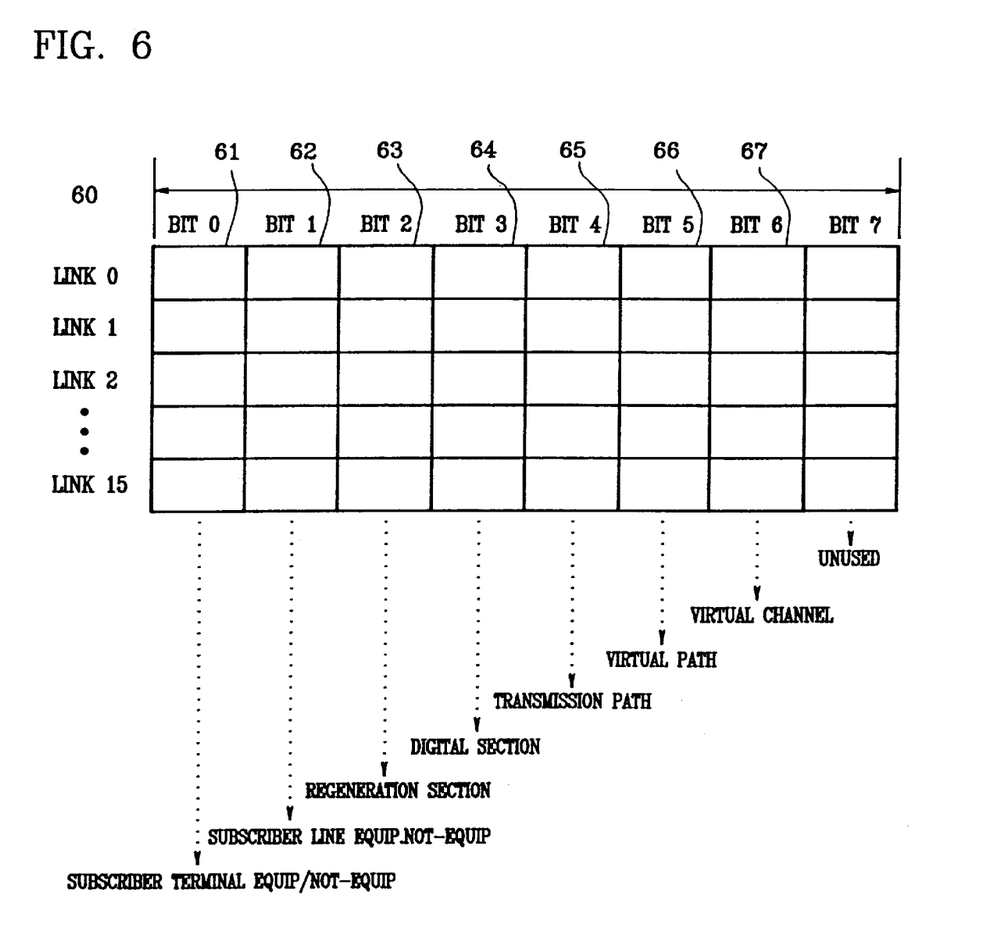
FIG. 6 is a diagram illustrating a state indication method for subscriber lines according to the present invention.

FIG. 6 illustrates a indication method of state information for subscriber lines according to the present invention.

As shown therein, in the state information table, the state information 60 of each link of the Sb interface is indicated as one Octet. In each octet, the equipment state of a subscriber line from the least significant bit (LSB) 61 by one bit (equipped: 1, non-equipped: 0), the equipment state of the subscriber link 62 (equipped: 1, non-equipped: 0), the state of the regeneration section 63 (abnormal: 1, normal: 0), the state of the digital section 64 (abnormal: 1, normal: 0), the state of the transmission path 65 (abnormal: 1, normal: 0), the state of the virtual path 66 (abnormal: 1, normal: 0), and the state of the virtual channel 67 (abnormal: 1, normal: 0) are sequentially indicated.

Figure 7:
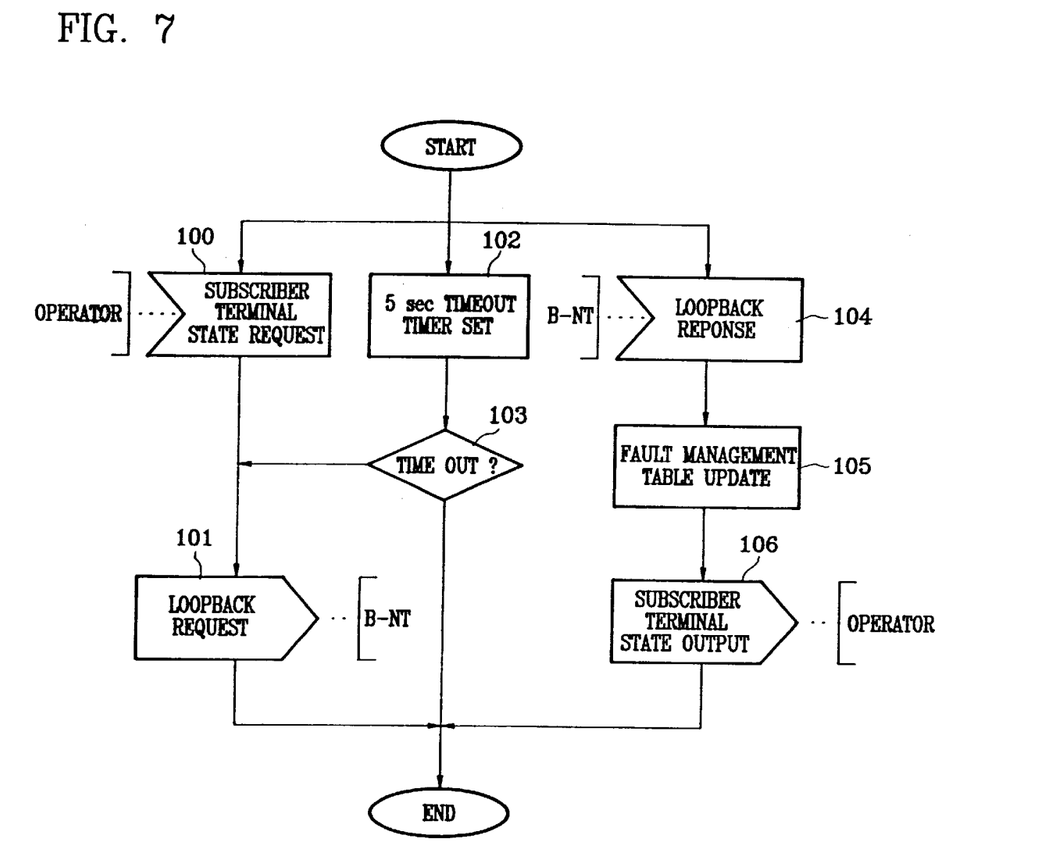
FIG. 7 is a flow chart illustrating a maintenance method for subscriber lines in an ATM PVC switching system according to the present invention.

FIG. 7 is a flow chart illustrating a maintenance method for subscriber lines in an ATM PVC switching system according to the present invention.

As shown therein, the B-NT apparatus transmits a VP__AIS (Virtual Path__Alarm Indication Signal) to an end point of the VPC (Virtual Path Connection) when a fault is detected from the subscriber line of B-NT indicating that the fault occurred in a corresponding link. However, in the ATM PVC switching system which performs a VP switching function, since it is impossible to recognize the VC__AIS message, it is impossible to recognize the fault state of subscriber lines of the B-NT. Therefore, in the present invention, a method in which it is possible to recognize the state of the Sb link by using a loopback OAM cell in the ATM PVC switching system is provided.

The ATM PVC switching system transmits the loopback OAM cell to the B-NT apparatus in step 102 when operator requests a state of subscriber links of the B-NT in Step 100, or the loopback operation timer becomes time-out in Step 101. When the B-NT apparatus receives a loopback OAM cell from the switching system, the related fault and performance information of the subscriber which is currently gathered is carried on the response loopback OAM cell and then is transmitted to the ATM PVC switching system. The ATM PVC switching system (in Step 103) which receives the loopback response message from the B-NT stores the state information of the Sb link into the state management table in Step 104 and outputs the state information of subscriber links to the operator terminal in Step 105, so that the operator can repair the fault of corresponding links.

Figure 8:
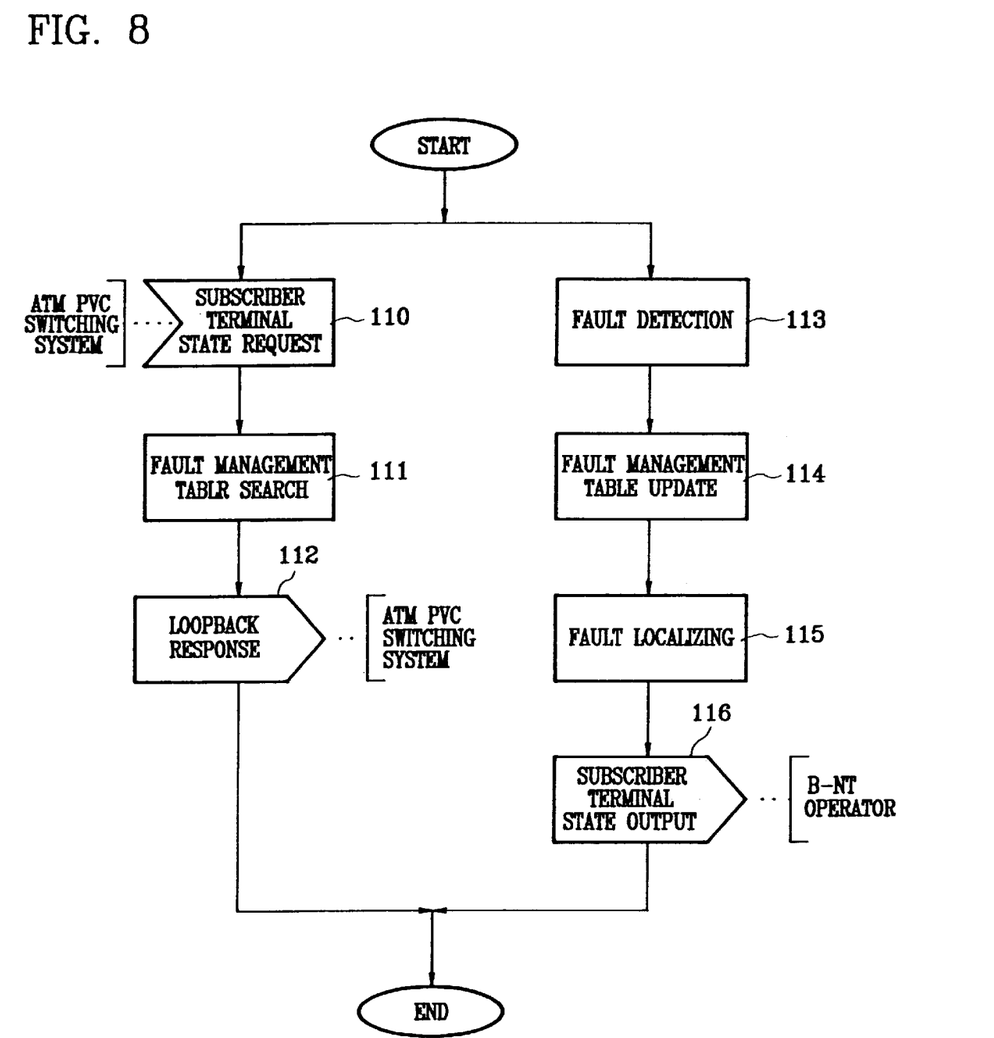
FIG. 8 is a flow chart illustrating a maintenance method of subscriber lines in a B-NT which performs a VC switching function according to the present invention.

FIG. 8 is a flow chart illustrating a maintenance method of subscriber lines in a B-NT which performs a VC switching according to the present invention.

As shown therein, when the B-NT receives a loopback request from the ATM PVC switching system in Step 110, the current state information of the subscriber link is searched from the state management table in Step 111, and then the searched information is carried on the loopback response message in the manner as shown in FIG. 6 and is transmitted to the PVC switching system in Step 112. In addition, when the B-NT checks the state with respect to the link of the subscriber and then detects the fault in Step 113, this fault information is stored into the state management table in Step 114. Furthermore, the link of the subscriber in which the fault occurred is isolated from the fault in Step 115, and this information is outputted to the operator terminal of the B-NT in Step 116.

As described above, in the present invention, it is possible to perform in real time a maintenance operation with respect to subscriber lines of B-NT apparatus in the ATM PVC switching system, whereby it is possible to reduce the maintenance cost and to increase the reliability of the telecommunication network. In addition, it is possible to enhance the quality of telecommunication services.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A maintenance method for subscriber lines of a broadband network termination apparatus in an asynchronous transfer mode permanent virtual connection switching system disposed in a delivery network of a broadband integrated service digital network for performing virtual path switching and operation, administration and maintenance functions, and a broadband network termination device disposed in a customer premises network and connected to the asynchronous transfer mode permanent virtual connection switching system for performing a network termination function, multiplexing/concentrating/switching functions and fault performance management functions, comprising the steps of:

transmitting using the asynchronous transfer mode permanent virtual connection switching system a loopback operation, administration and maintenance cell to the broadband network termination device when one of the asynchronous transfer mode permanent virtual connection switching system receives a request of a state information of subscriber lines of the broadband network termination from an operator and a loopback execution timer becomes time-out;

carrying the state information of subscriber lines of the broadband network termination device on the loopback operation, administration and maintenance cell using the broadband network termination device which receives the loopback operation, administration and maintenance cell from the asynchronous transfer mode permanent virtual connection switching system and transmits the state information of subscriber lines to the asynchronous transfer mode permanent virtual connection switching system; and storing the state information of subscriber lines into a state management table using the asynchronous transfer mode permanent virtual connection switching system which receives the loopback operation, administration and maintenance cell from the broadband network termination device and reporting the state information of subscriber lines to the system operator.

2. The method in accordance with claim 1 further comprising the steps of:

performing fault and performance management functions using the broadband network termination device with respect to subscriber lines so as to generate a result of maintenance and storing the result of maintenance into the state management table; and localizing a fault line and informing administrator of the result of maintenance.

* * * * *